United States Patent
Jaramillo

(10) Patent No.: US 9,883,738 B2
(45) Date of Patent: Feb. 6, 2018

(54) BOTTLE CAP STADIUM TABLE

(71) Applicant: Jacob Jaramillo, Albuquerque, NM (US)

(72) Inventor: Jacob Jaramillo, Albuquerque, NM (US)

(*) Notice: Subject to any disclaimer, the term of this patent is extended or adjusted under 35 U.S.C. 154(b) by 76 days.

(21) Appl. No.: 15/184,021

(22) Filed: Jun. 16, 2016

(65) Prior Publication Data

US 2017/0360191 A1    Dec. 21, 2017

(51) Int. Cl.
| | |
|---|---|
| *A47B 13/08* | (2006.01) |
| *A47B 13/10* | (2006.01) |
| *A47B 13/12* | (2006.01) |
| *B32B 3/26* | (2006.01) |
| *B32B 7/04* | (2006.01) |
| *B32B 7/12* | (2006.01) |
| *B32B 3/30* | (2006.01) |
| *B32B 3/08* | (2006.01) |
| *G09F 23/00* | (2006.01) |

(52) U.S. Cl.
CPC ............ *A47B 13/083* (2013.01); *A47B 13/10* (2013.01); *A47B 13/12* (2013.01); *B32B 3/085* (2013.01); *B32B 3/266* (2013.01); *B32B 3/30* (2013.01); *B32B 7/045* (2013.01); *B32B 7/12* (2013.01); *G09F 23/00* (2013.01); *B32B 2307/414* (2013.01); *B32B 2451/00* (2013.01); *B32B 2479/00* (2013.01); *B32B 2590/00* (2013.01)

(58) Field of Classification Search
CPC .. A47B 45/00; A47B 13/12; A47B 2220/0077
USPC ........ 108/13, 23, 26, 24, 161, 90; D6/688.1, D6/688, 329, 336, 641, 650.1
See application file for complete search history.

(56) References Cited

U.S. PATENT DOCUMENTS

| | | | | |
|---|---|---|---|---|
| 1,591,095 A | * | 7/1926 | Meyer ................... | A63F 7/0628 273/DIG. 13 |
| 2,652,657 A | * | 9/1953 | Joy ......................... | A47B 27/00 108/23 |
| 3,792,543 A | * | 2/1974 | Powell ................... | A41D 29/00 206/458 |
| 4,120,248 A | * | 10/1978 | Broach .................. | A47B 13/12 108/23 |
| 4,438,579 A | * | 3/1984 | Engel ..................... | G09F 19/12 40/661 |
| 5,066,078 A | * | 11/1991 | Wurst .................... | A47B 13/12 312/114 |

(Continued)

FOREIGN PATENT DOCUMENTS

EP    2309179 A1    4/2011

OTHER PUBLICATIONS http://www.stadiumtable.com, retrieved Sep. 28, 2016.

*Primary Examiner* — Jose V Chen
(74) *Attorney, Agent, or Firm* — Robert D. Watson

(57) ABSTRACT

A bottle cap stadium/arena table related to the field of indoor/outdoor furniture. More specifically, a table that mimics a stadium/arena in which sports fans can customize using their own bottle caps. The inventive device includes a table frame with perforated plates that hold decorative bottle caps around the central sporting area that mimics people sitting in the stands; including miniature accessories to depict a particular sporting event (goals, flags). The table, which mimics a miniature stadium/arena, includes a glass tabletop that acts as the table's surface. The table is user customizable to a specific sporting team.

31 Claims, 20 Drawing Sheets

(56) References Cited

U.S. PATENT DOCUMENTS

| | | | |
|---|---|---|---|
| 5,600,911 A * | 2/1997 | Lucci | A47G 11/004 |
| | | | 108/25 |
| D419,797 S * | 2/2000 | Pelletier | D21/357 |
| D442,248 S * | 5/2001 | Weber | D21/782 |
| 6,367,392 B2 * | 4/2002 | Moore | A47B 13/12 |
| | | | 108/27 |
| D469,649 S | 2/2003 | Kreuzer | |
| 6,659,879 B1 * | 12/2003 | Cartwright | A47B 13/083 |
| | | | 108/90 |
| D488,335 S * | 4/2004 | Kerr | D21/357 |
| 6,739,271 B1 * | 5/2004 | Hancock | A47B 13/12 |
| | | | 108/27 |
| D501,335 S * | 2/2005 | Stangl | D6/651 |
| D521,259 S * | 5/2006 | Hightower | D6/337 |
| 7,730,841 B2 | 6/2010 | Wang | |
| D622,980 S * | 9/2010 | Dively | D6/688.1 |
| D730,587 S * | 5/2015 | Pellerin | D30/118 |
| 2006/0169184 A1 | 8/2006 | Funkhouser | |
| 2009/0308286 A1 * | 12/2009 | Bourbeau | A47B 96/00 |
| | | | 108/23 |
| 2015/0300627 A1 * | 10/2015 | Wang | F21V 33/0012 |
| | | | 108/23 |
| 2016/0135586 A1 * | 5/2016 | Neudeck | A01K 63/006 |
| | | | 312/114 |

* cited by examiner

SEC A-A

SEC B-B

SEC B-B

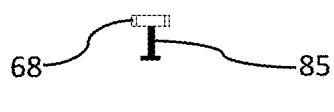
FIG. 15A                FIG. 15B
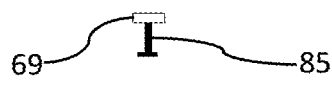
FIG. 15C                FIG. 15D
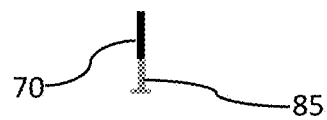
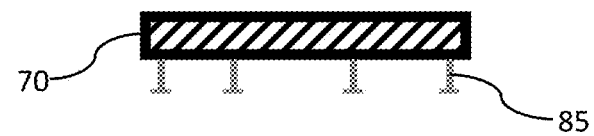
FIG. 15E                FIG. 15F

BOTTLE CAP STADIUM TABLE

BACKGROUND

This invention relates to the field of furniture. More specifically the invention relates to a table that mimics or represents a sporting layout. In some embodiments, sports fans can customize the table using their own bottle caps.

DESCRIPTION OF RELATED ART

There are many varieties of indoor/outdoor tables that already exist. As described in more detail below, similar tables may include, by way of example, a do-it-yourself (DIY) bottle cap table depicting a chosen sporting team, an air hockey table, a foosball table, etc.

DIY "Do It Yourself" bottle cap table instructions are available on the Internet. This product consisting of a table in which the bottle caps are laid horizontally on a table and often times an epoxy is poured over them, or a grout is used to fill the spacing between bottle caps, so the table is level and flat. Various designs can be made out of the bottle cap layout; however, they are always laid flat, used as the tabletop surface and/or the bottle caps lay in a plane parallel to the table surface. These tables don't represent a stadium/arena. The use of epoxy/grout makes the bottle cap pattern/layout permanent and non-replaceable.

Air Hockey tables are something similar, which are already on the market. A typical air hockey table consists of large smooth playing surface, a surrounding rail to prevent the puck and mallets from leaving the table, and slots in the rail at either end of the table that serve as goals. On the ends of the table behind and below the goals, there is usually a puck return. There are no user customizable features of a standard air hockey table.

Foosball tables are something similar, which are already on the market. This product consists of a plastic or metal table where a game of soccer is played using players attached to poles. A ball made from various types of material is dropped into the field and players on either side of the table control the poles to try and score on each other. There are no user customizable features of a standard foosball table.

The present invention seeks to provide a table where sports fans can easily and simply customize a table (designed to look like a sports stadium or arena) to their favorite sports team, and to use their own bottle caps. The present invention does not create a game for people to play, but rather is a piece of functional furniture and/or piece of art for their favorite team.

BRIEF DESCRIPTION OF THE DRAWINGS

Various other objects, features and attendant advantages of the present invention will become fully appreciated as it becomes better understood when considered in conjunctions with the accompanying drawings. Reference characters designate the same or similar parts throughout the several views:

FIG. 15A-F are elevation views of a diagram of a baseball field home plate, bases No. 1-3, and outfield wall accessories.

DETAILED DESCRIPTION OF THE INVENTION

Figure 1A:
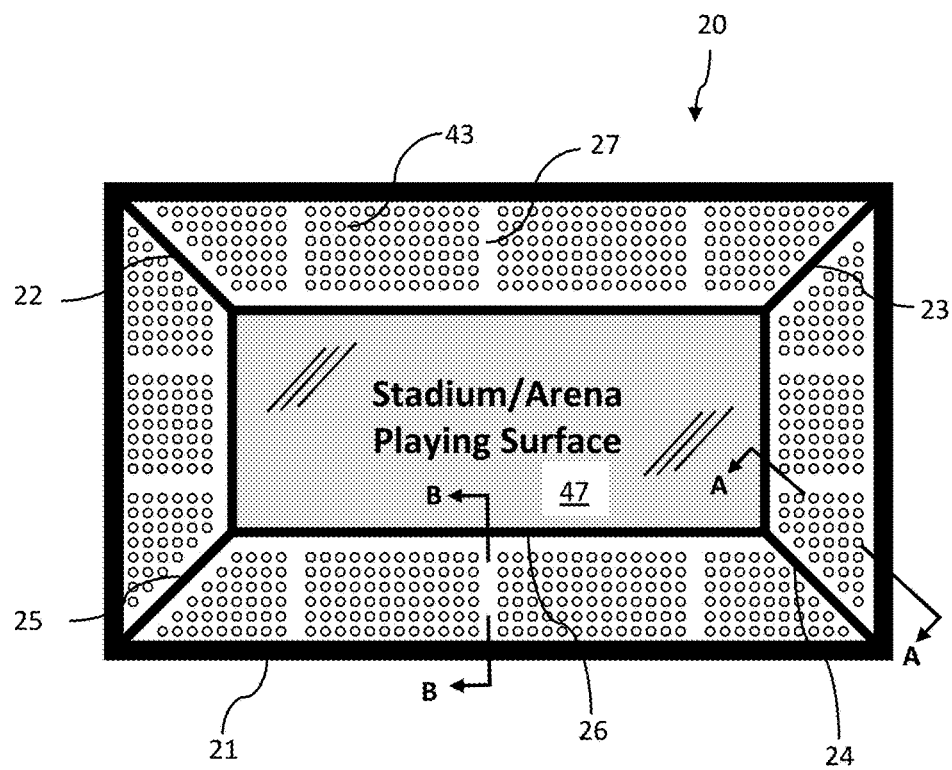
FIGS. 1A-C are aerial views of the present invention.

Turning now descriptively to the drawings, in which similar reference characters denote similar elements throughout the several views.

The table of the present invention may comprise any number of legs, for example, from 1 (a pedestal), 2, 3, 4, 5, to 6 legs, or more.

In a first embodiment, the table of the present invention comprises four legs attached to a lower rectangular frame near the middle of the legs, and attached to an upper rectangular frame at the top of the legs. The lower frame holds a horizontal base plate that has a sporting surface displayed on the base plate's upper surface. The upper frame holds an optional tabletop made of a clear material, such as glass or clear plastic (e.g., acrylic, Plexiglas).

Figure 1B:
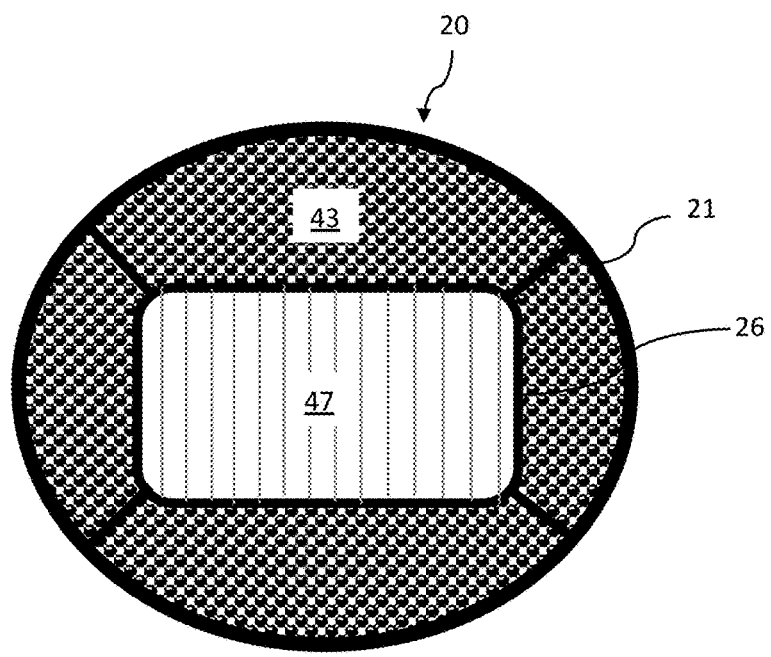
Figure 1C:
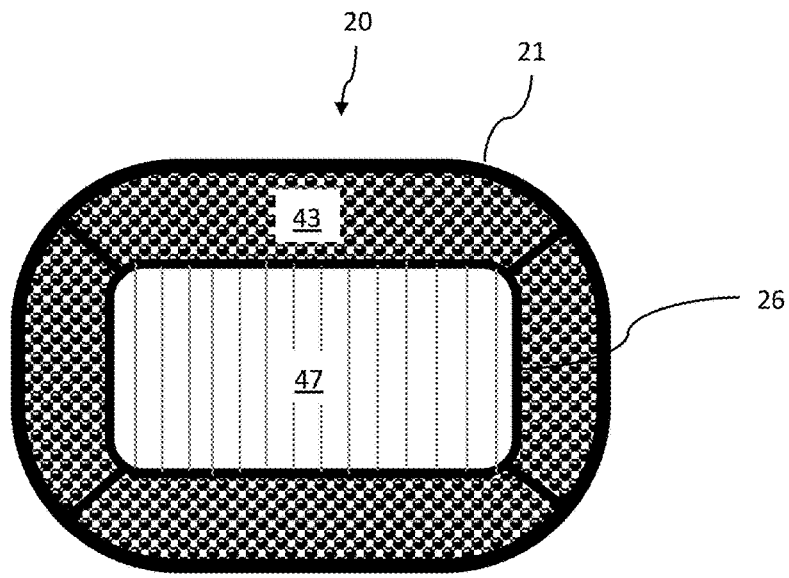

In other embodiments, the table may be oval or circular in shape, as viewed from the top (See FIGS. 1B, 1C).

Figure 2:
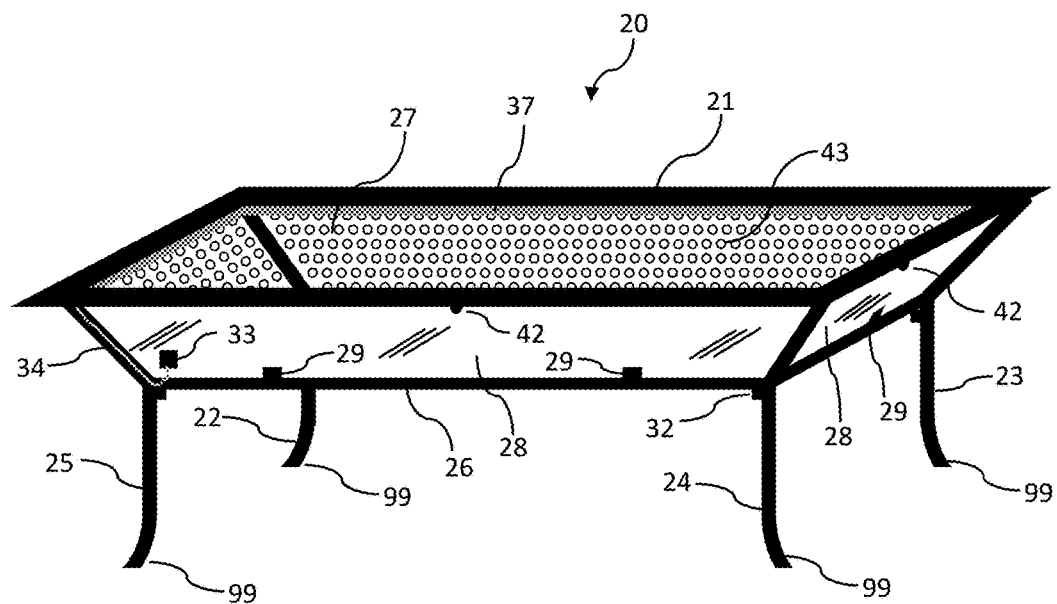
FIG. 2 is a perspective view of the present invention.

FIG. 1A and FIG. 2 illustrates a first example of a table 20, which is comprised of a tabletop upper frame 21 having four legs 22, 23, 24 and 25 which can be made of metallic rectangular tubing (e.g., steel or aluminum) held together by the rectangular lower frame 26, which can be made of a metallic rectangular tubing. A perforated top plate 27 and it's respective solid back plate 28 are held to a rectangular frame 26 via hinges 29, which can be spot welded. Table 20 comprises four perforated top plates 27 and four solid back plates 28. The perforated top plate 27 combines with the solid back plate 28 to form a bottle-cap holder plate 97, which is rotatable about an axis that is horizontal. A battery pack 33 powers lights, which are later described in FIG. 3. The wire 34 of the lights runs up, for example, leg 25, under the tabletop frame 21. Legs 22, 23, 24, 25 have an upper portion that is angled at a tilt angle, θ, with respect to the horizon (see FIG. 3 and FIG. 5B). The tilt angle, θ, can range from 20 to 45 degrees, with a preferred angle being 30 degrees. The bottom part of legs 22, 23, 24, 25 can be flared outwards with each leg having a flared end 99.

Figure 3:
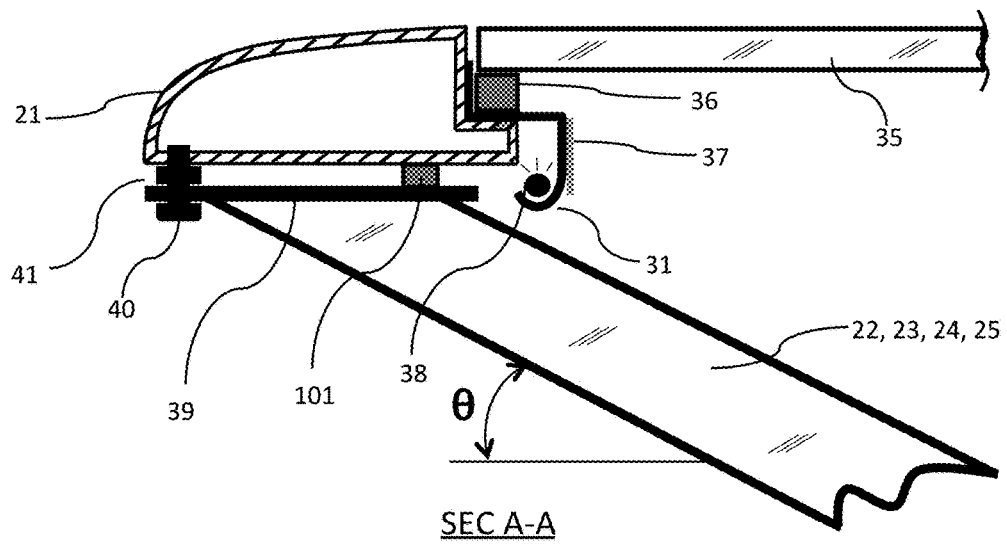
FIG. 3 is a detailed side view of the table frame, leg, light and decal assembly and glass top of the present invention.

FIG. 3 illustrates a bolt 41 which is welded or screwed to the metallic tabletop frame 21. The table legs 22, 23, 24, 25 are mounted to the tabletop frame 21, via a screw 40, which is inserted through a horizontal mounting plate 39, which is mounted to the top of each table leg 22, 23, 24, 25 and then screwed into the bolt 41. A strand of lights 38, which can be LED lights, are tucked into a translucent plastic frame 31. The plastic frame 31 is attached to the tabletop upper frame 21 via rubber plugs 36 that pass through holes in the plastic frame 31 and are inserted into holes in an extension 66 of the tabletop frame 21. The clear tabletop 35 of the table 20 rests on the top of the rubber plugs 36 to avoid glass-on-metal contact. A semi-transparent decal 37 is placed on the plastic piece 31 to mimic stadium signage/lighting. This lighting technique is used for all sporting layouts (with the exception of the soccer field). The lighting layout for the soccer field is described in FIG. 12. Tabletop 35 can be clear glass or clear plastic (e.g., acrylic, Plexiglas).

Figure 4A:
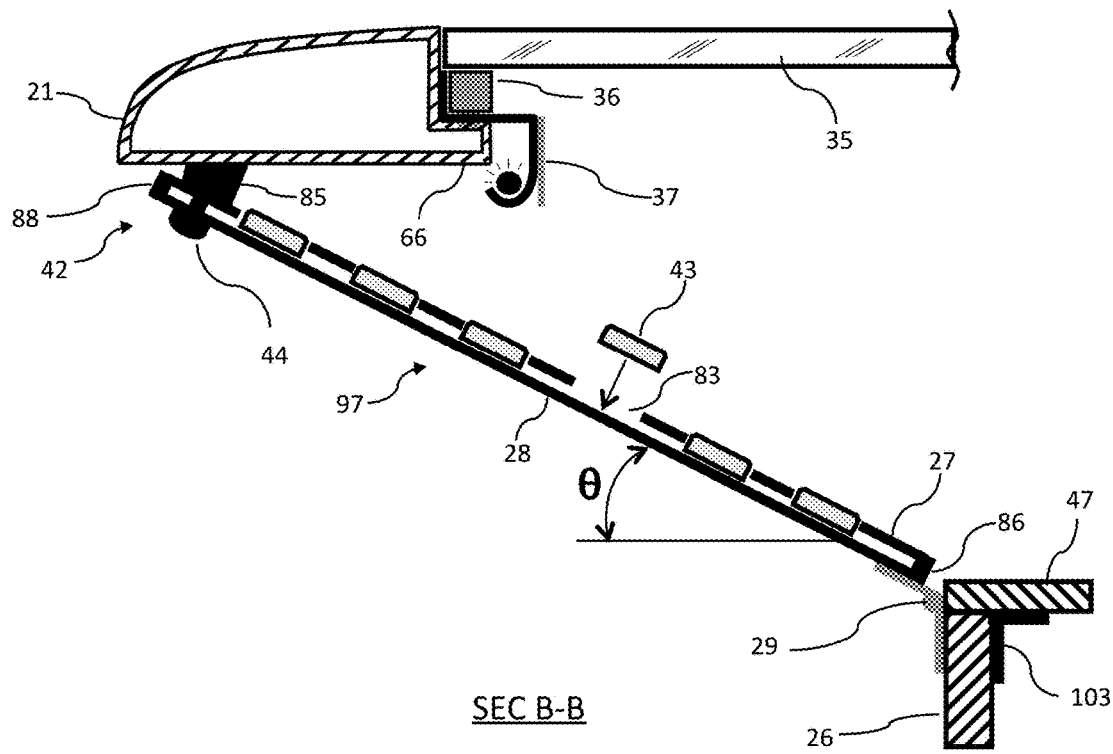
FIG. 4A is a detailed side view of an apparatus that holds the bottle caps in place, in the closed position.
Figure 4B:
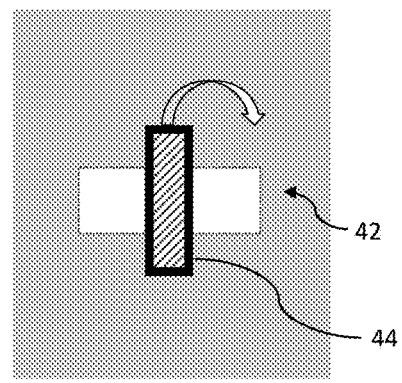
FIG. 4B is a detailed elevation view of a latching mechanism.
Figure 4C:
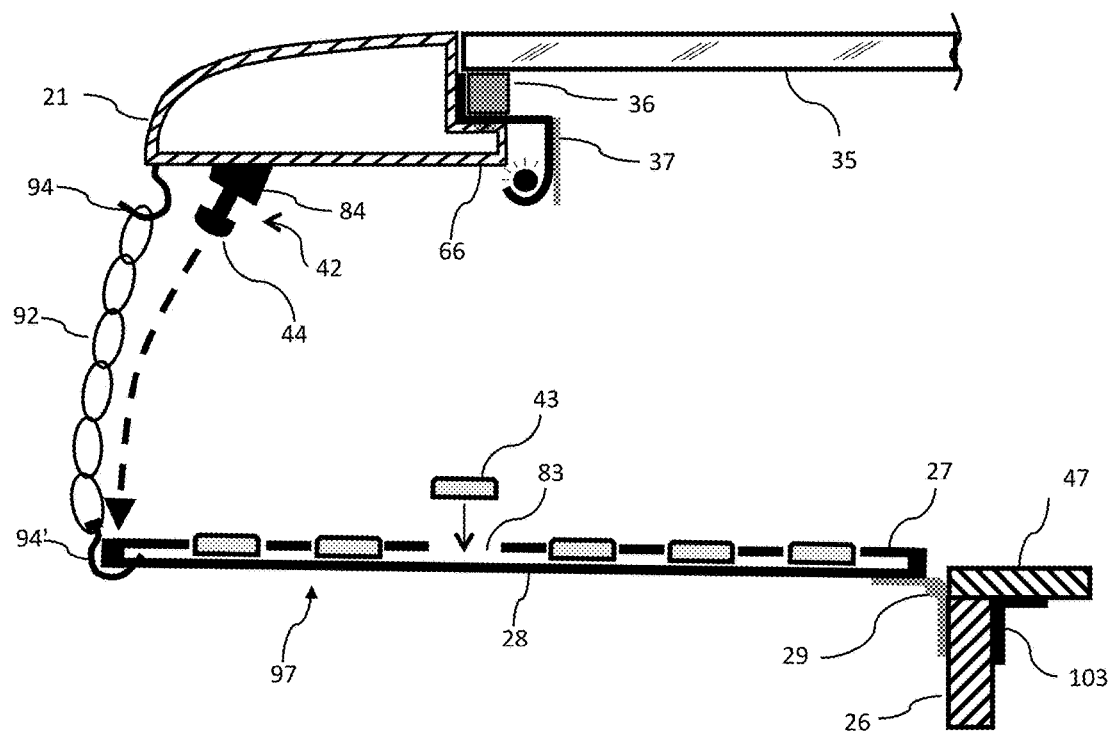
FIG. 4C is a detailed side view of the apparatus that holds the bottle caps in place, in the open position.

FIGS. 4A and 4C illustrate a perforated top plate 27 and its respective solid back plate 28, which is connected to the tabletop frame 21 via a latching mechanism 42, which has a latch 44. The placement of bottle caps 43 in perforated top plates 27 is user customizable, and the bottle caps can represent or mimic an audience of the sporting arena sitting in their seats. The respective two plates 27 and 28 can be spaced apart a distance that is thinner than the thickness of a standard bottle cap. The perforated plates 27 and their respective back plates 28 can be screwed together or spot welded together at top 88 and bottom 86 locations to form a rotatable bottle-cap holding plate 97, which is attached to the rectangular frame 26 with hinges 29. Plates 27 and 28 can be made of metal, e.g., aluminum, aluminum alloy, or steel, or plastic. Plates 27 and 28 can be powder-coated any color, or otherwise painted or finished with a finish or surface treatment. Use of hinge 29 makes the bottle-cap holding plate 97 rotatable about a horizontal axis. The latch 44 can be rotated 90 degrees to latch/unlatch the upper part of holding plate 97 from the tabletop frame 21, as shown in FIG. 4B. The latch 44 is attached to the tabletop frame 21 via an angled nut 84. Bottle-cap holding plate 97 is angled at the same angle, θ, with respect to the horizontal, as the upper part of legs 22, 23, 24, 25. The tilt angle, θ, can range from 20 to 45 degrees, with a preferred angle being 30 degrees. Alternatively, in place of using actual bottle caps 43, an adhesive decal (or decals) can be placed on bottle-cap holding plate 97 that has an artistic depiction of people sitting in their stadium seats. Base plate 47 rests on top of lower frame 26. Spacer block 101 (washer) sits in-between plate 39 and upper frame 21, which can be secured with a bolt (not shown). Base plate 47 can be secured to lower frame 26 using an L-bracket 103 and bolts (not shown).

Bottle caps 43 can be placed by the user in recessed slots (perforations, circular recesses) 83 in the perforated plate 27, which are supported via the back plate 28. The pattern of recesses 83 can be a simple square pattern, or it can be a hexagonal close packed pattern. Alternatively, the pattern can be a random pattern. The perforated plates 27 and their respective back plates 28 can be unlatched by operating the latching mechanism 42 and opening the plates (i.e., rotated downwards to a horizontal position) in a manner to allow placement of bottle caps 43 in their designated slots in the perforated plates 27. When unlatched and rotated to a horizontal position, the bottle-cap holding plate 97 can be supported by a flexible, lightweight chain, strap, loop, or strip of metal, or fabric or plastic or rubber 92 that is attached to hooks 94 and 94'. Once all of the bottle caps 43 have been placed in it's designated hole on the perforated plate 27, the perforated plate 27 and it's respective back plate 28 can be rotated back into it's latched position and then latched back to the table main frame 21 by rotating the latch 44 to its closed position. Alternatively, a thin, clear plastic or clear glass cover plate (not shown) can be disposed over the bottle caps to keep them in place (e.g., when the table is being moved). Alternatively, latching mechanism 42 can comprise magnetic latching means (e.g., a magnet and magnetic material). Other latching mechanisms can be used, as is well-known in the art.

Figure 5A:
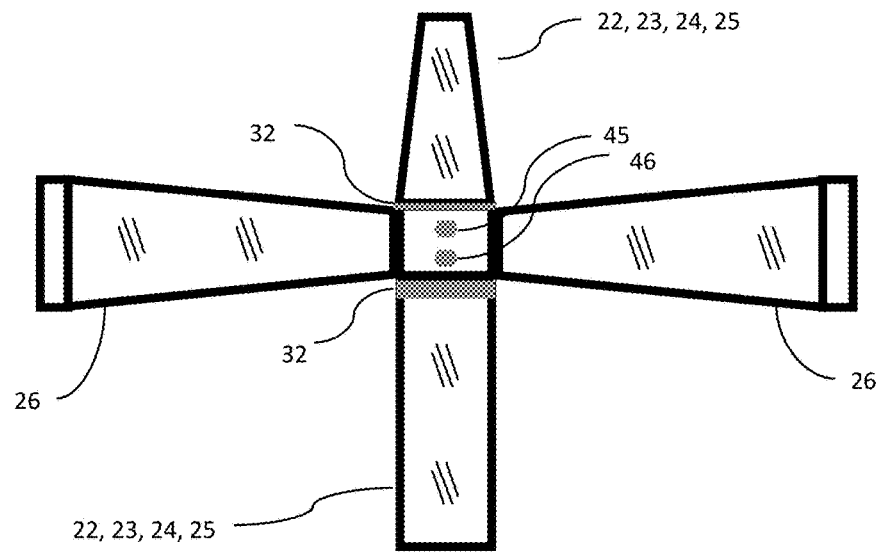
FIGS. 5A-B are side views of the rectangular base plate mounted to a leg.
Figure 5B:
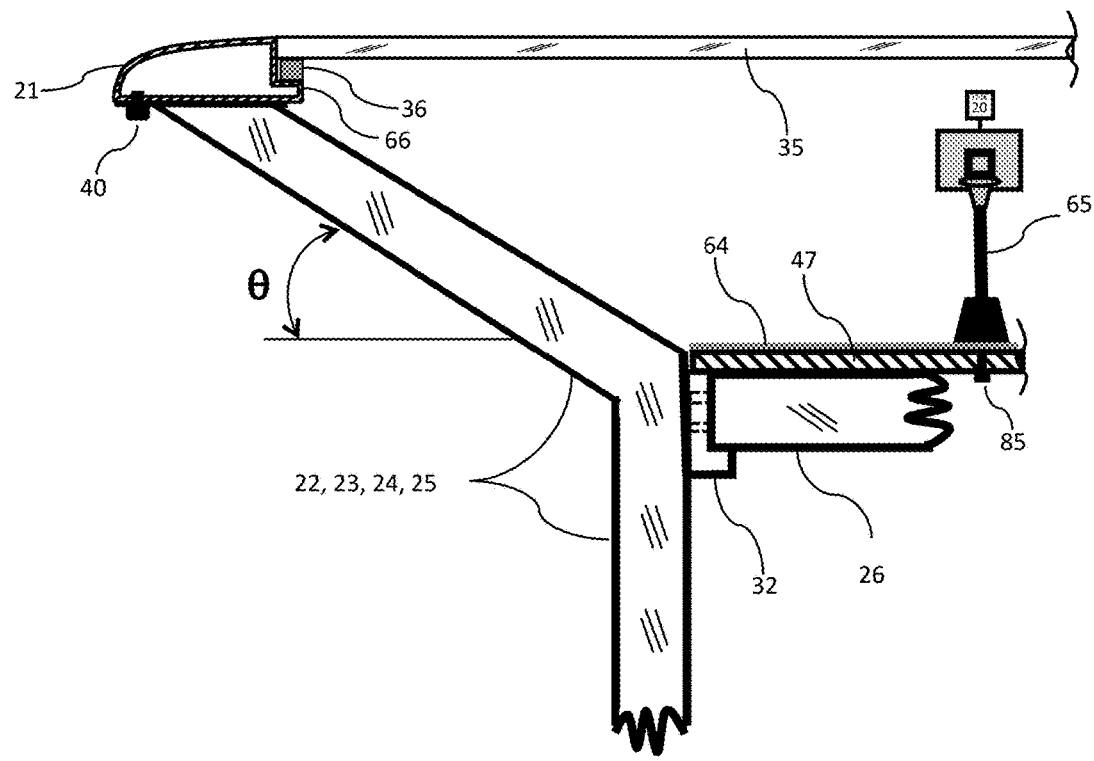

FIGS. 5A and 5B illustrates an example of how the rectangular lower frame 26 can be attached to each leg 22, 23, 24, 25. An L-shaped bracket 32 is welded to each metallic leg 22, 23, 24, 25, and has two threaded holes. Bolts 45, 46 are passed through the rectangular table frame 26 and screwed into the L-bracket 32. FIG. 5B is an elevation side view showing the upper frame 21, glass top 35, lower frame 26 with base 47 resting on frame 26, and legs 22, 23, 24, 25. Sporting surface 64 (basketball surface) is disposed on top of base 47. Miniature basketball goal accessory 65 is bolted down to the top of base 47 using bolt 85.

Figure 6:
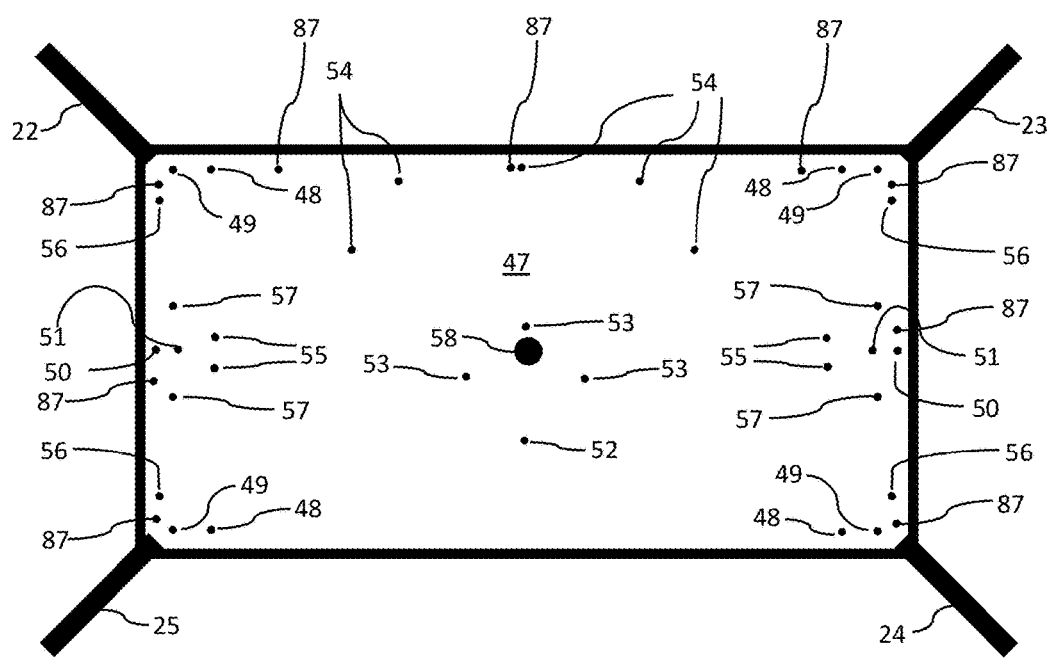
FIG. 6 is an aerial view of the base plate of the playing area that has numerous holes to accommodate any and all sports of the present invention.

FIG. 5B and FIG. 6 illustrates the base plate 47 which will hold the stadium/arena's playing surface (not shown). The base plate 47 can be attached to the rectangular frame 26 with screws, L-brackets and welds. Or, the base plate 47 can simply rest in the frame 26 under it's own weight. The base plate 47 has numerous holes 48-58 and 87 that accommodate miniature accessories of numerous sports layouts, including: football, basketball, baseball, hockey and soccer. Other types of games/events can be mimicked (e.g., tennis, lacrosse, Indianapolis 500 or Le Mans racecar track, track & field). Holes 48 are for the beginning of the end zone pylons and holes 49 are for the back of the end zone pylons as well as for soccer corner flags. Holes 50 are for holding football field goal posts. Holes 57 are for holding soccer goals. Holes 55 are for holding hockey goals and holes 48, 49, 50 and 56 are utilized for the hockey rink wall. Holes 51 are for holding basketball hoops. Holes 52 and 53 are for holding the baseball field home plate and bases Nos. 1-3. Holes 54 are for holding the baseball field green wall surrounding the outfield. Holes 58 are for holding a shade umbrella, which can pass through the entire table and is supported by an umbrella stand that can rest on the floor. If customers do not wish to utilize an umbrella they can choose not to perforate the hole in their respective sports layout. Holes 87 are for holding decals for soccer perimeter advertising lights and their respective light cables.

Base plate 47 can comprise a sporting surface disposed on the upper surface of the base plate 47. The sporting surface can be a pattern that is painted (e.g., screen-printed) on the base plate 47, or it can comprise a separate piece of plastic (e.g., a plastic film or laminate) that has the sporting surface pattern printed inside the plastic with a matching pattern of holes that match up to the holes pre-drilled in the base plate 47. The plastic laminate can be adhesively attached to the base.

Figure 7:
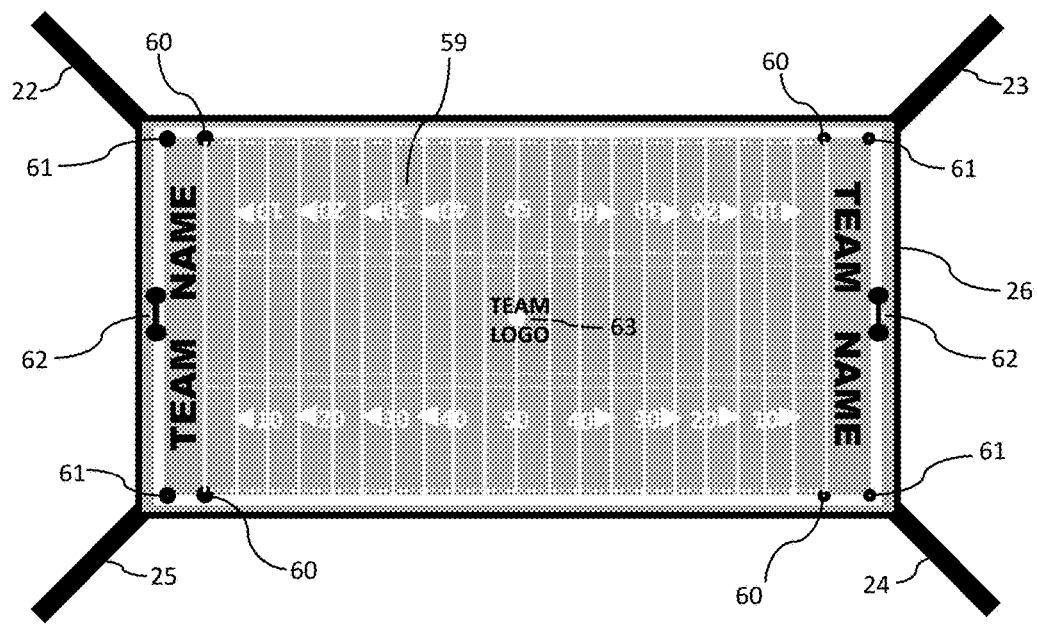
FIGS. 7-11 are aerial views of diagrams of various sporting layouts.

FIG. 7 illustrates a football stadium sporting surface 59 by which an artificial turf (or green felt layer) field is laid out.

Figure 13A:
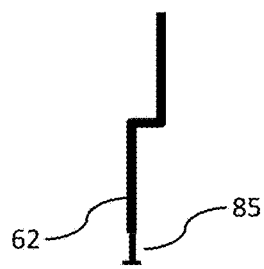
FIGS. 13A-D are elevation views of a diagram of a football field goal post and football pylons accessories.
Figure 13B:
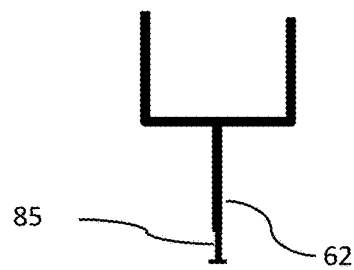
Figure 13C:
Figure 13D:
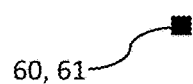

The set of miniature accessories 60-62 (FIG. 13A, B, C, D) can be passed through the grass (or felt) and table base plate 47 and secured by a bolt 85 on the bottom of the base plate 47.

Figure 8:
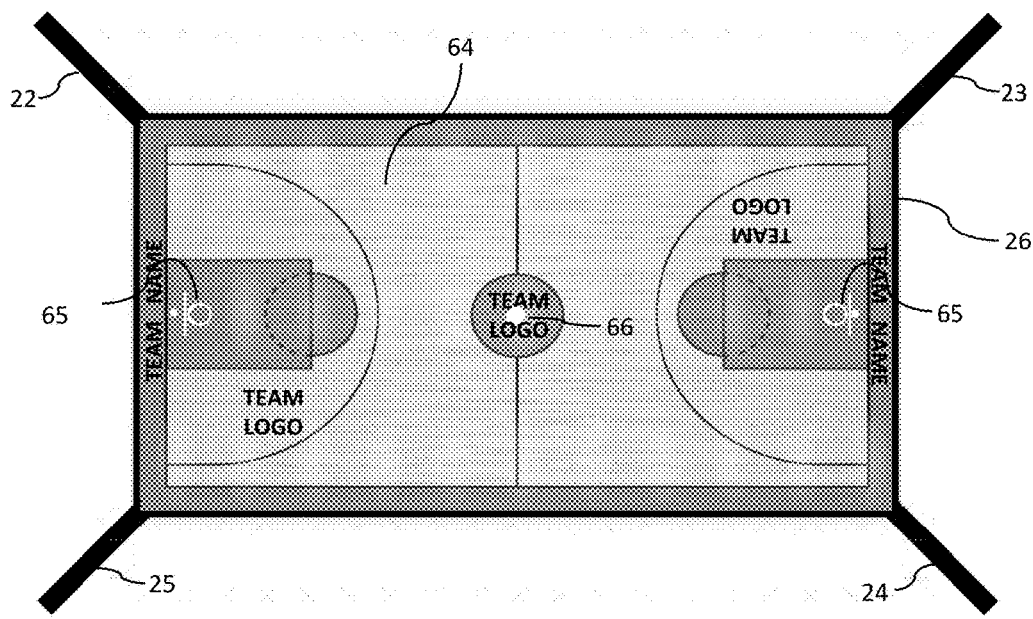

FIG. 8 illustrates a basketball court sporting surface 64 by which a court is laid out. The set of miniature accessories 65 (FIG. 14A, B) can be passed through the court and table base plate 47 and secured by a bolt 85 on the bottom of the base plate 47.

Figure 9:
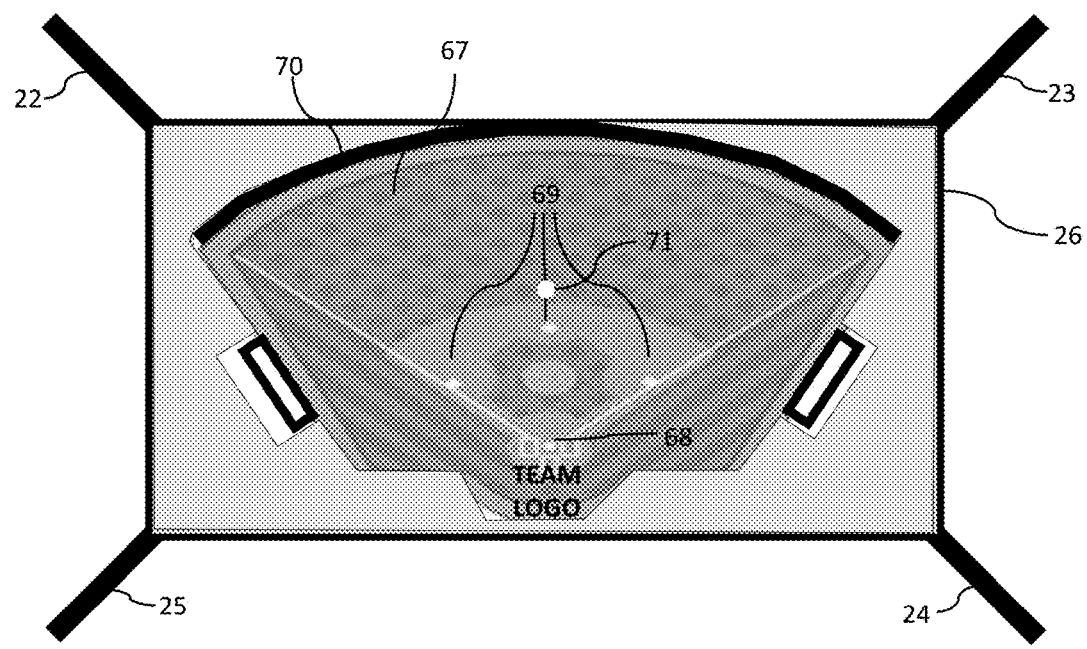

FIG. 9 illustrates a baseball field sporting surface 67 by which a field is laid out. The set of miniature accessories 68-70 (FIG. 15A, B, C, D, E, F) can be passed through the field and table base plate 47 and secured by a bolt 85 on the bottom of the base plate 47.

Figure 10:
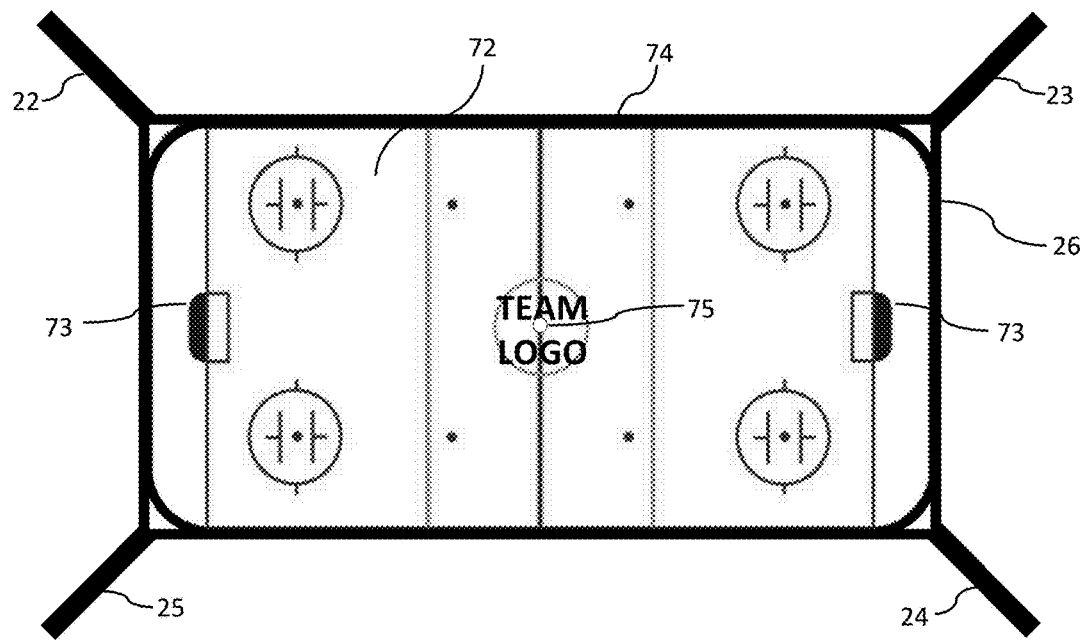
Figure 16A:
FIGS. 16A-D are elevation views of a diagram of a hockey rink goals and surrounding wall with glass extension accessories.
Figure 16B:
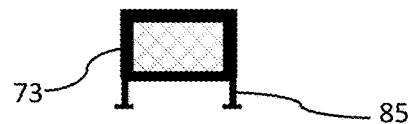
Figure 16C:
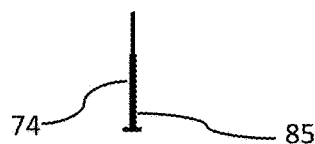
Figure 16D:
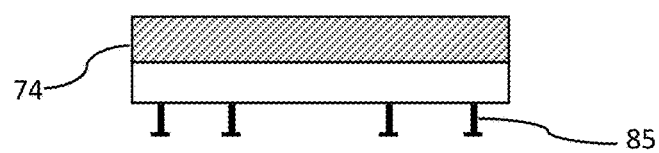

FIG. 10 illustrates a hockey rink sporting surface 72 by which a rink is laid out. The set of miniature accessories 73-74 (FIG. 16A, B, C, D) can be passed through the court and table base plate 47 and secured by a bolt 85 on the bottom of the base plate 47.

Figure 11:
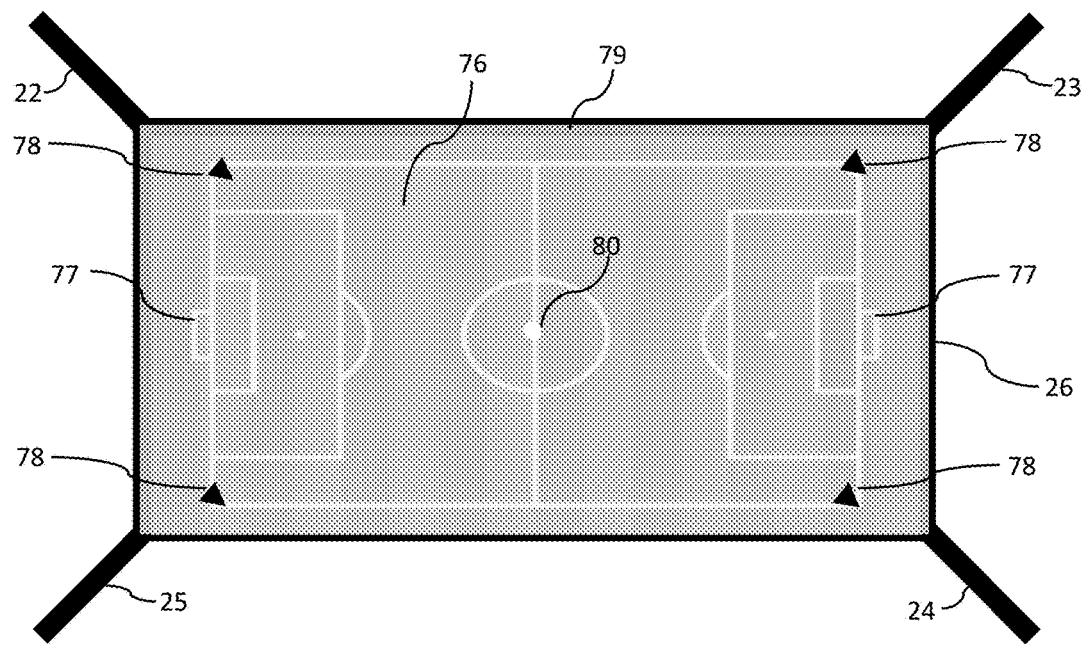

FIG. 11 illustrates a soccer field sporting surface 76 by which a field is laid out. The set of miniature accessories 77-78 (FIG. 17A, B, C) can be passed through the court and table base plate 47 and secured by a bolt 85 on the bottom of the base plate 47.

Figure 12:
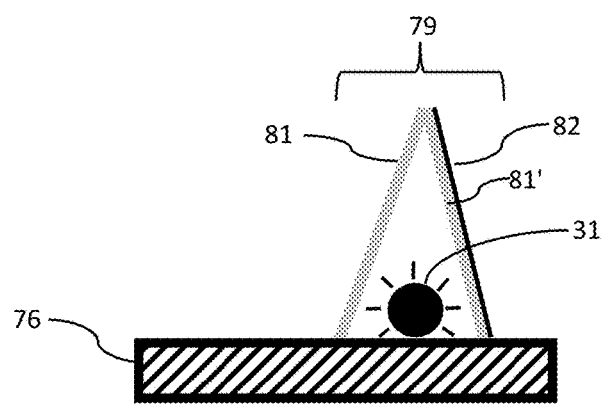
FIG. 12 is a side view of an accessory for a soccer field.

FIG. 12 illustrates the lighting feature 79 is to be placed around three of the four sides of the soccer field. Feature 79 comprises a light source 31 disposed inside of a tent-shaped translucent plastic display structure 81, 81', with a decorative colored decal 82 on the face of surface 81'.

FIGS. 13A-D are elevation views of a diagram of a football field goal post 62 and football pylons 60, 61 accessories. Bolt 85 is used to hold the accessories to the base plate 47.

Figure 14A:
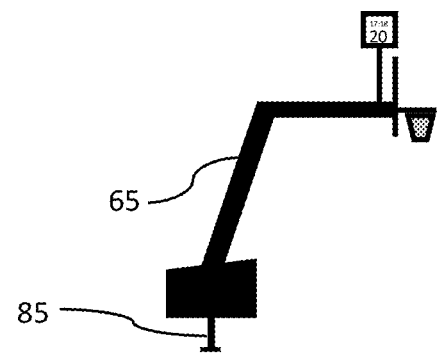
FIGS. 14A-B are elevation views of a diagram of a basketball court basketball hoop accessories.
Figure 14B:
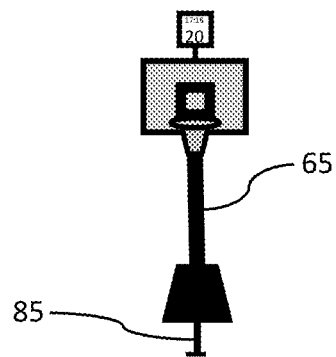

FIGS. 14A-B are elevation views of a diagram of a basketball court basketball hoop 65 accessory. Bolt 85 is used to hold the accessories to base plate 47.

FIG. 15A-F are elevation views of a diagram of a baseball field home plate 68, bases No. 1-3, 69, and outfield wall 70 accessories. Bolt 85 is used to hold the accessories to the base plate 47.

FIGS. 16A-D are elevation views of a diagram of a hockey rink goals 73 and surrounding wall with glass extension 74 accessories. Bolt 85 is used to hold the accessories to the base plate 47.

Figure 17A:
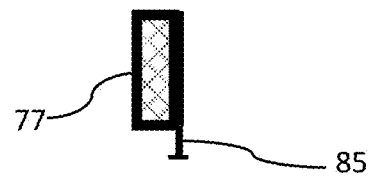
FIGS. 17A-C are elevation views of a diagram of a soccer field goal and corner flag accessories.
Figure 17B:
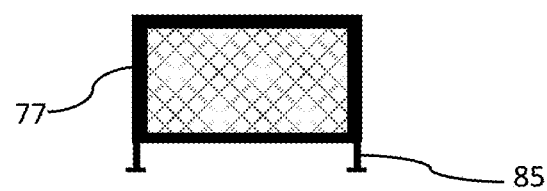
Figure 17C:
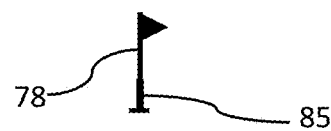

FIGS. 17A-C are elevation views of a diagram of a soccer field goal 77 and corner flag 78 accessories. Bolt 85 is used to hold the accessories to the base plate 47.

Figure 18A:
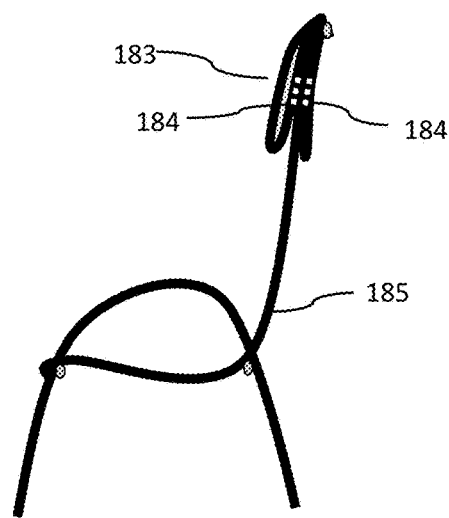
FIGS. 18A-B are elevation views of a padded headrest.
Figure 18B:
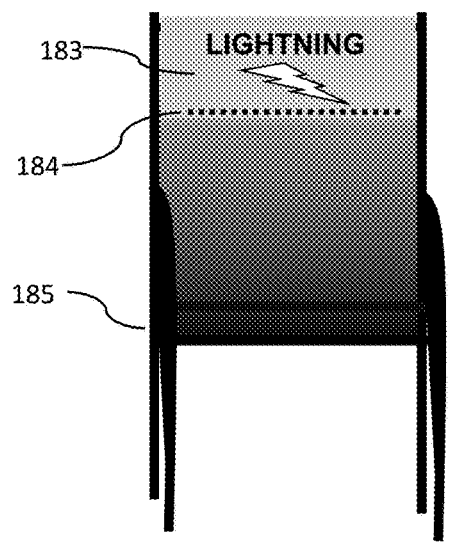

FIGS. 18A and 18B illustrates a padded headrest 183 which contains magnets 184 to hold the front and back of the headrest 183 together when placed over the chair 185. The padded headrest 183 will have a team name and logo on the front side, as shown in FIG. 18B.

Figure 19:
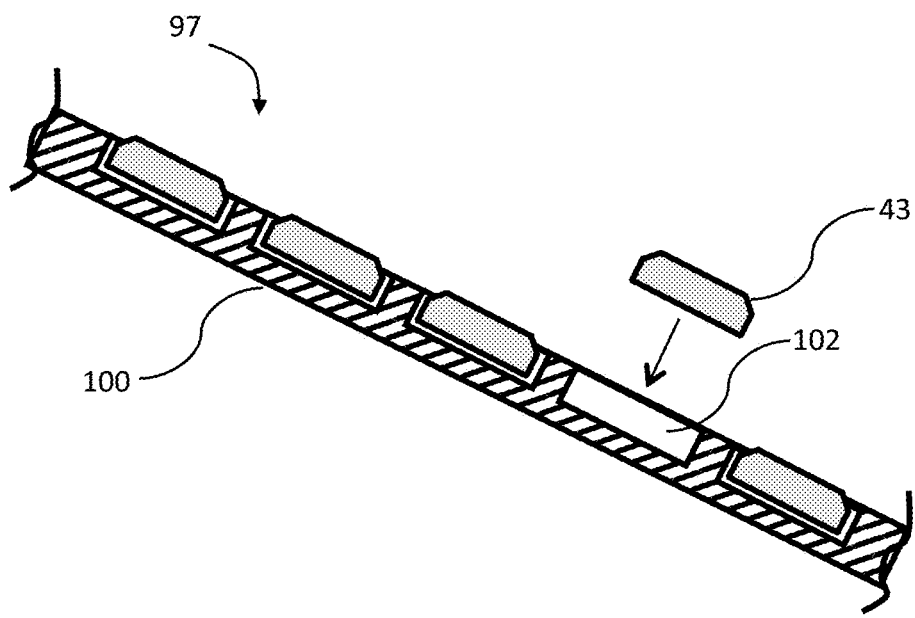
FIG. 19 is a side view of a plate for holding bottle caps.

FIG. 19 shows a side view of an embodiment of a bottle-cap holding plate 100, which includes a plurality of recesses 102 for holding bottle caps 43. Plate 100 is a single, thick, integrated plate that has had bottle cap recesses 102 machined out (e.g., milled) of the plate partially through the thickness of the plate 100.

Figure 20:
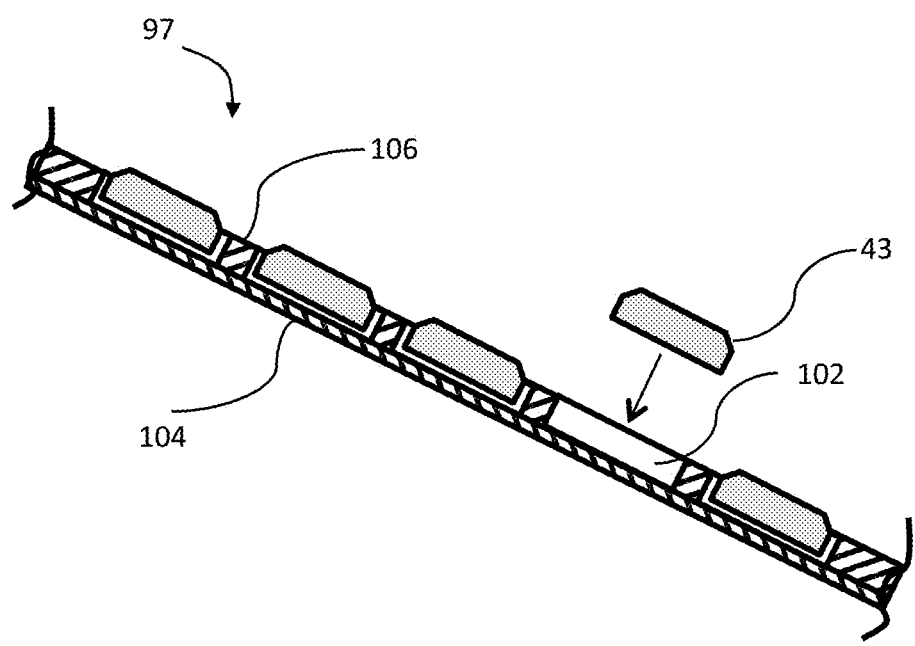
FIG. 20 is a side view of a plate for holding bottle caps.

FIG. 20 shows a side view of another embodiment of a bottle-cap holding plate. Perforated top plate 106 can be adhesively bonded or spot welded to a solid back plate 104 to make a two-part structural laminate. In other words, the spacing between the top and back plates is zero. The top plate 106 includes a plurality of recesses 102 for holding bottle caps 43. The depth of the recesses 102 can be sufficiently deep so as to securely hold the bottle caps 43. The bottom plate 104 can have a different thickness than the top plate 106. For example, the bottom plate 104 can be thinner than the top plate 106.

Figure 21:
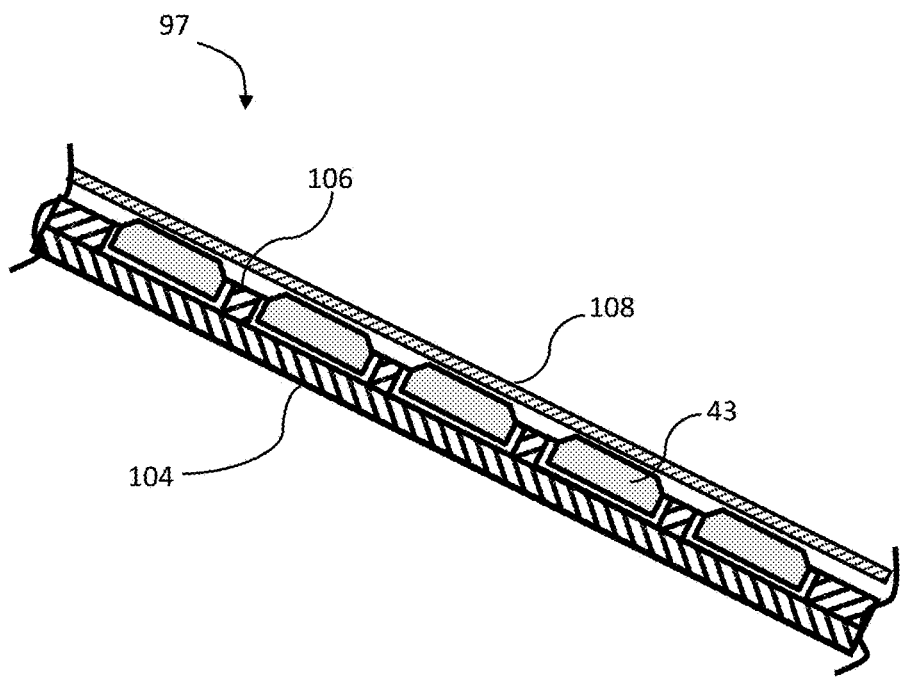
FIG. 21 is a side view of a plate for holding bottle caps.

FIG. 21 shows a side view of another embodiment of a bottle-cap holding plate. Perforated top plate 106 can be adhesively bonded or spot-welded to a solid back plate 104 to make a two-part structural laminate. The top of the array of bottle caps 43 is covered by a thin sheet 108 of clear glass or clear plastic (e.g., acrylic or Plexiglas). This sheet serves to keep the bottle caps from falling out of their recesses 102 when the entire table is moved.

In other embodiments, the bottle caps 43 can be glued in place in their recesses, to make them a permanent installation. Alternatively, a thick, removable adhesive can be used to make the bottle cap installation semi-permanent.

Figure 22:
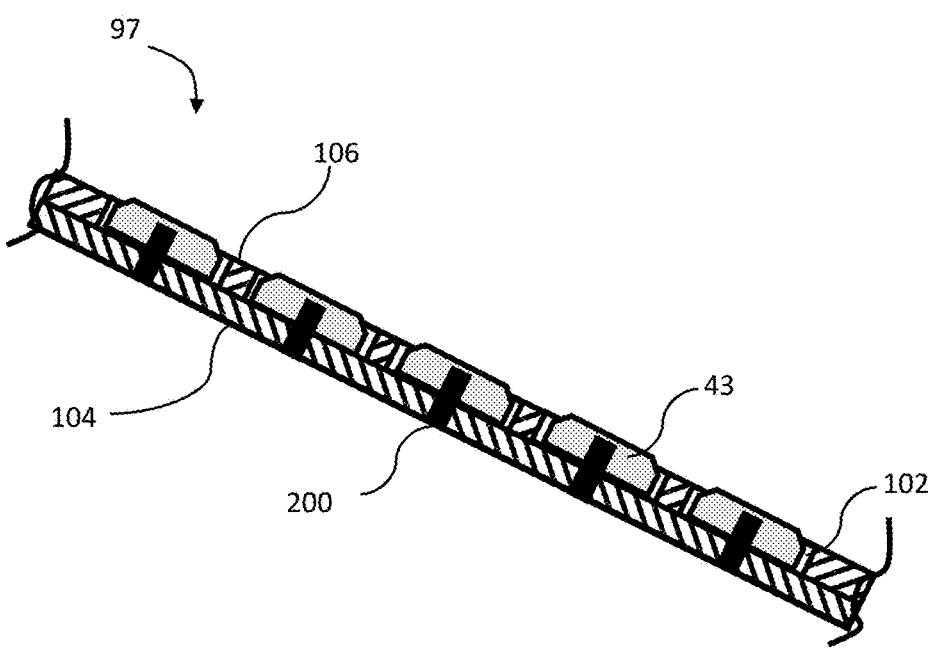
FIG. 22 is a side view of a plate for holding bottle caps.

FIG. 22 shows a side view of another embodiment of a bottle cap array. Here, a small magnet 200 is placed and glued inside a hole drilled in lower plate 104, inside of each recess 102, which magnetically attracts the bottle caps to the lower plate and holds them in place. Alternatively, these types of magnets can be used in the embodiments shown in FIG. 19-21.

In some embodiments, a large adhesive decal can be placed on bottle-cap holding plate 97 that has an artistic depiction of many people sitting in their stadium seats. In this case, plate 97 would not need to be perforated, and could be a single plate thick.

In other embodiments, an adhesive decal of an image of a person (the same or different persons) can be adhered to the top of each bottle cap.

In some embodiments, the wires for the LED lights can be fed down one of the legs, since the battery case can be mounted to one of the legs. In other embodiments, the lighting can be driven by standard 120 V wall current.

Figure 23A:
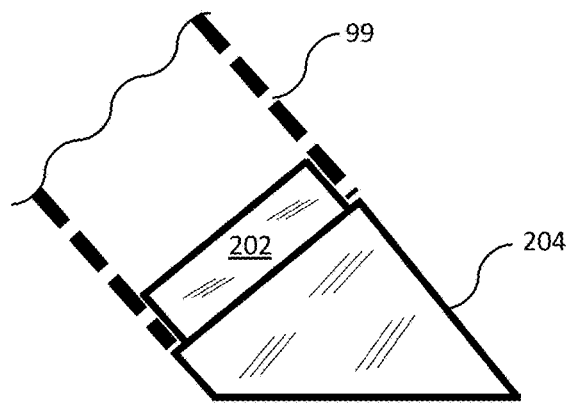
FIG. 23A is a front elevation view of a plastic foot.
Figure 23B:
FIG. 23B is an aerial view of a plastic foot.
Figure 23C:
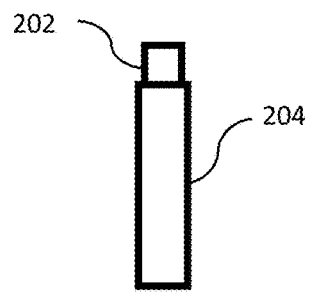
FIG. 23C is a side elevation view of a plastic foot.

FIGS. 23A-C show different views of a plastic foot 204, which has a thinner upper insert portion 202 that inserts into the bottom 99 of hollow leg 22, 23, 24, 25. The purpose of the plastic foot 204 is to prevent corrosion of a metal (e.g., steel) leg when resting on a water-covered surface (e.g., when outdoors). Alternatively, the legs of the table 20 can be made of stainless steel or aluminum alloy. The plastic foot 204 can be made of any plastic, such as polyethylene. The plastic foot 204 can also help to prevent scratching of the flooring. Alternatively, the plastic foot 204 can have a rounded bottom profile (not shown).

Figure 24A:
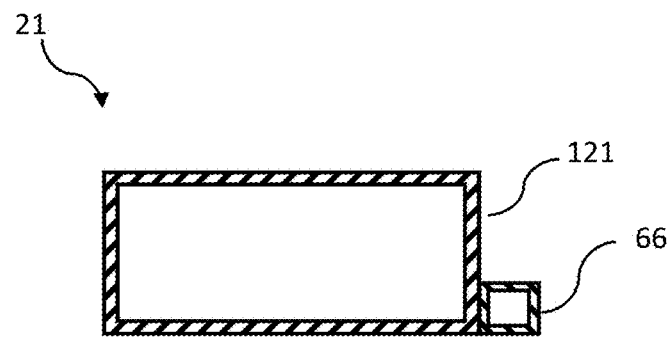
FIGS. 24A-C are cross-section elevation views of different examples of a top frame profile.
Figure 24B:
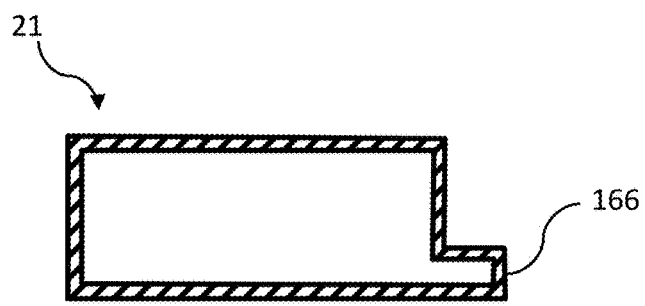
Figure 24C:
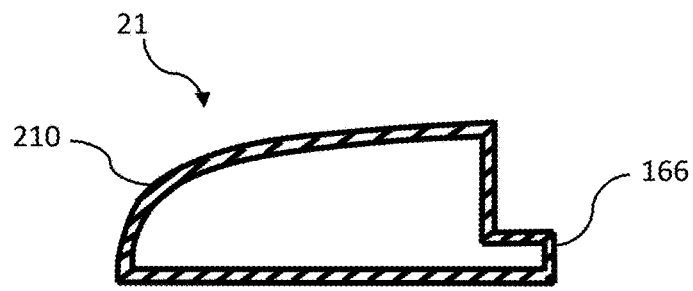

FIGS. 24A-C are side elevation cross-section views of different examples of the top frame 21. FIG. 24A illustrates an example where the frame's profile is made of two different rectangular cross-section rails, 21 and 66, which are welded or bolted together to make an integral frame 21. FIG. 24B illustrates an example where the rail 21 is made of extruded aluminum or aluminum alloy, which includes an inside extension (bump-out/ledge) 166 located on the inner edge of frame 21. FIG. 24C illustrates an example where the frame 21 is made of extruded aluminum or aluminum alloy, wherein frame 21 comprises a curved, bull-nosed outer edge (corner) 210 (which is easily formed using an extrusion process). The three different frame profiles have approximately the same bending strength and stiffness.

Figure 25A:
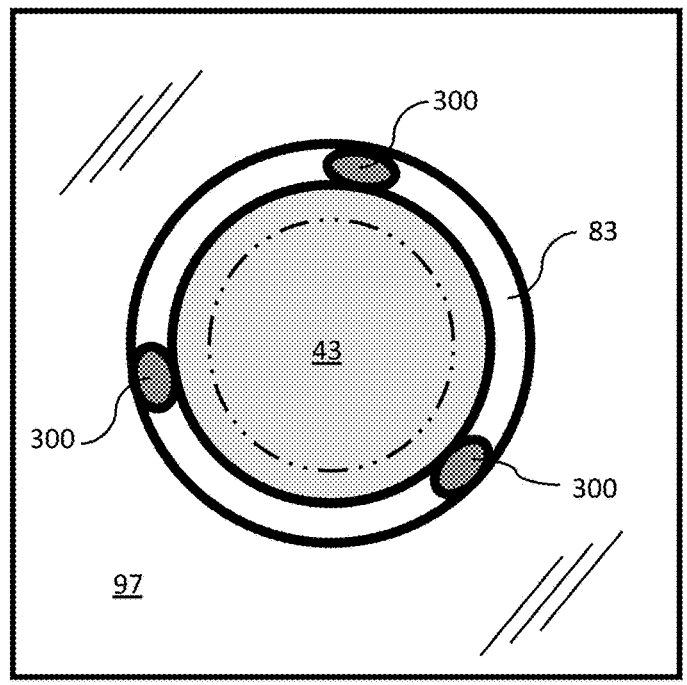
FIG. 25A shows a plan view of a bottle cap held with rubberized nubs.

FIG. 25A shows a plan view of a bottle cap 43 held with rubberized nubs 300. Rubberized means that the nub 300 is made of rubber or any other elastomer that has rubber-like, elastic properties. Three nubs are shown in FIG. 25A, although other numbers of nubs can be used (e.g., 4, 5, 6, etc.). The nubs can be glued into place, or held by friction. Alternatively, nubs 300 can be formed from a sheet of rubber or gasket-like material that is sandwiched in-between the top and bottom plates (27, 28).

Figure 25B:
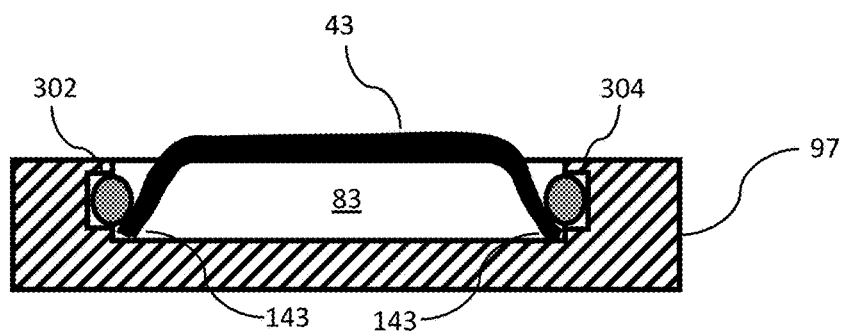
FIG. 25B shows a cross-section side view of a bottle cap held with a rubberized O-ring.

FIG. 25B shows a cross-section side view of a bottle cap held with a rubberized O-ring 302, which is disposed inside of circular recess 83. O-ring 302 is disposed inside of a groove 304 machined along the inner diameter of recess 83. The flared ends 143 of the bottle caps 43 are captured and securely held underneath the O-ring confinement ring.

Having described my invention, I claim:

1. A table configured to resemble a sporting arena of a specific sporting team, the table comprising: a lower frame connected to at least one leg, for holding a horizontal base plate; wherein the base plate has an upper surface with a pattern that resembles a specific sporting area corresponding to the specific sporting team; and further comprising a plurality of bottle caps disposed on a bottle-cap holding plate; wherein the bottle-cap holding plate is attached to the base plate at a lower end of the bottle-cap holding plate, and the bottle-cap holding plate is tilted up at a tilt angle with respect to a horizon; wherein placement of the bottle caps in the bottle-cap holding plate mimic an audience of the sporting arena.

2. The table of claim 1, further comprising a plastic laminate attached to the upper surface of the base plate, wherein the plastic laminate includes the pattern that resembles the specific sporting area corresponding to the specific sporting team.

3. The table of claim 1, wherein the sporting area includes one or more miniature surface accessories that are related to its respective sport, which are attached to the base plate through holes disposed in the base plate.

4. The table of claim 1, further comprising perimeter lighting located behind translucent decals, which are related to the specific sporting team.

5. The table of claim 1, wherein the tilt angle of the bottle-cap holding plate ranges from 20-45 degrees.

6. The table of claim 5, wherein the tilt angle of the bottle-cap holding plate is 30 degrees.

7. The table of claim 1, wherein the bottle-cap holding plate comprises a perforated front plate and a solid back plate, wherein a spacing between the front plate and the back plate is thinner than a thickness of a standard bottle cap; and wherein the bottle caps are disposed in perforations of the perforated front plate.

8. The table of claim 7, wherein the front and back plates are spot-welded together at top and bottom locations to make the bottle-cap holding plate.

9. The table of claim 7, wherein the spacing between the front plate and back plate is zero, and the front plate is adhesively attached or spot-welded to the back plate.

10. The table of claim 1, wherein the bottle-cap holding plate is attached to the base plate with at least one hinge, and the bottle-cap holding plate is rotatable about a horizontal axis passing through the hinge.

11. The table of claim 10, wherein the bottle-cap holding plate further comprises a magnetic latching mechanism for holding the bottle-cap holding plate in a closed and locked tilted position at a tilt angle with respect to the horizon.

12. The table of claim 1, further comprising: (a) an upper frame attached to upper ends of the at least one leg; and (b) a clear tabletop made of clear glass or clear plastic that is held by the upper frame.

13. The table of claim 12, wherein the upper frame is made of an extruded aluminum alloy, and includes a curved outside corner and a rectangular inside ledge.

14. The table of claim 1, wherein the bottle-cap holding plate is a plate comprising an array of recesses that penetrate only partially through the plate's thickness; and wherein said recesses are sufficiently deep so as to securely hold the bottle caps by gravity.

15. The table of claim 1, further comprising a thin, clear glass or clear plastic cover sheet disposed on top of the bottle-cap holding plate, for securely holding the bottle caps in place when the table is moved.

16. The table of claim 1, further comprising a plurality of magnets disposed in the bottle-cap holding plate, wherein each magnet holds an individual bottle cap in place.

17. The table of claim 1, further comprising at least one plastic foot insert that extends downwards from a bottom of the at least one leg.

18. The table of claim 1, wherein the bottle-cap holding plate comprises a plurality of rubberized nubs disposed inside of recesses in the bottle-cap holding plate that removably hold each bottle cap in place by friction.

19. The table of claim 1, wherein the bottle-cap holding plate comprises a plurality of recesses, and each recess comprises an elastic O-ring disposed inside of the recess that removably holds a bottle cap in place.

20. The table of claim 1, including a sporting surface disposed on the horizontal base plate selected from at least one of: a football stadium; a basketball arena;
 a soccer stadium; a baseball stadium, and a hockey arena;
  wherein the sporting surface includes a plurality of miniature surface accessories disposed on said surface, which are related to its respective sport; and
  wherein the table includes perimeter lighting located behind decals that are related to its respective sporting team.

21. The table of claim 20, wherein the sporting surface mimics a material of a real life sporting surface, for its respective sport.

22. The table of claim 21, wherein the sporting surface is artificial turf or green felt.

23. The table of claim 20, wherein the sporting surface and decals are user customizable to a specific sporting team.

24. The table of claim 20, wherein the decals are translucent, thereby allowing light to shine through.

25. The table of claim 20, wherein the decals are placed on a translucent supporting material allowing the light to shine through and illuminate the decal.

26. A table configured to resemble a sporting arena of a specific sporting team, the table comprising:
 a lower frame connected to at least one leg, for holding a horizontal base plate; wherein the base plate has an upper surface with a pattern that resembles a specific sporting area corresponding to the specific sporting team;
 further comprising a plastic laminate attached to the upper surface of the base plate, wherein the plastic laminate has the pattern that resembles a specific sporting area corresponding to the specific sporting team;
 wherein the sporting area includes one or more miniature surface accessories that are related to its respective sport, which are attached to the base though holes disposed in the base;
 further comprising perimeter lighting located behind translucent decals that are related to the specific sporting team;
 further comprising: a plurality of bottle caps placed in a section of the table, wherein placement of the bottle caps mimic an audience of the sporting arena; and a bottle-cap holding plate attached to the base plate and placed at a tilt angle to the horizontal, for holding the bottle caps;

wherein the tilt angle of the bottle-cap holding plate is 30 degrees from the horizontal;
wherein the bottle-cap holding plate comprises a perforated front plate and a solid back plate, wherein a spacing between the front plate and back plates is thinner than the thickness of a standard bottle cap;
wherein the bottle-cap holding plate is rotatable about a horizontal axis;
wherein the front plate includes perforations for holding each bottle cap, and the back plate assists in holding the bottle caps in place and prevents the caps from disengaging from the table;
wherein the bottle-cap holding plate is rotatably attached to the base plate with at least one hinge;
wherein the front and back plates are spot-welded together at the top and bottom locations to make the bottle-cap holding plate;
further comprising an upper frame attached to upper ends of the at least one leg; and a clear tabletop made of clear glass or clear plastic that is held by the upper frame;
wherein the sporting arena includes a sporting surface selected from at least one of: a football stadium; a basketball arena; a soccer stadium; a baseball stadium, and a hockey arena;
wherein the sporting surface mimics a material of a real life sporting surface, for its respective sport;
wherein the sporting surface and decals are user customizable to a specific sporting team; and
wherein the decals are translucent, thereby allowing light to shine through;
further comprising at least one plastic leg cover that covers a bottom of the at least one leg; and
wherein the top frame is made of extruded aluminum alloy, including a curved outside corner and a rectangular inner ledge.

27. A method of customizing a sporting arena table, comprising: (a) providing a sporting arena table with a user customizable set of multiple, tilted bottle-cap holding plates disposed around the perimeter of the table and rotatably attached to a central horizontal base plate with at least one hinge; (b) unlatching a latch holding an upper end of a bottle-cap holding plate; (c) rotating the bottle-cap holding plate down into a horizontal position by hand; (d) installing a vertical safety strap to secure the bottle-cap holding plate in a horizontal position; (e) placing one or more bottle caps in one or more bottle cap recesses disposed in the bottle-cap holding plate; (f) removing the vertical safety strap; (g) rotating the bottle-cap holding plate back up into it's original tilted position, and (h) securing the bottle-cap holding plate closed by closing the latch.

28. The method of claim 27, wherein the latch comprises a magnetic latching mechanism.

29. The table of claim 1, wherein the bottle caps are attached to the bottle-cap holding plate by an attachment force means selected from the group consisting of gravity force, friction force, adhesive force, and magnetic force, or combinations thereof.

30. The table of claim 1, wherein each bottle cap is disposed in a recess in the bottle-cap holding plate.

31. The table of claim 1, wherein the table comprises an upper support frame having one or more support legs; and wherein an upper end of the bottle-cap holding plate is removably attached to the tabletop upper frame by means of a latching mechanism, and the lower end of the bottle-cap holding plate is rotatably attached to the base plate by a hinge.

* * * * *